(12) United States Patent
Zhang et al.

(10) Patent No.: US 9,701,023 B2
(45) Date of Patent: Jul. 11, 2017

(54) TELEOPERATION OF MACHINES HAVING AT LEAST ONE ACTUATED MECHANISM AND ONE MACHINE CONTROLLER COMPRISING A PROGRAM CODE INCLUDING INSTRUCTIONS FOR TRANSFERRING CONTROL OF THE MACHINE FROM SAID CONTROLLER TO A REMOTE CONTROL STATION

(71) Applicant: ABB Technology AG, Zurich (CH)

(72) Inventors: Biao Zhang, West Hartford, CT (US); Jianjun Wang, West Hartford, CT (US); George Q. Zhang, Windsor, CT (US); Sangeun Choi, Simsbury, CT (US); Remus Boca, Simsbury, CT (US); Thomas A. Fuhlbrigge, Ellington, CT (US); Tomas Groth, Västerås (SE); Harald Staab, Windsor, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/649,186

(22) PCT Filed: Dec. 3, 2013

(86) PCT No.: PCT/US2013/072738
§ 371 (c)(1),
(2) Date: Jun. 2, 2015

(87) PCT Pub. No.: WO2014/088997
PCT Pub. Date: Jun. 12, 2014

(65) Prior Publication Data
US 2015/0314448 A1 Nov. 5, 2015

Related U.S. Application Data

(60) Provisional application No. 61/732,716, filed on Dec. 3, 2012.

(51) Int. Cl.
*G06F 19/00* (2011.01)
*B25J 9/16* (2006.01)

(52) U.S. Cl.
CPC ..... *B25J 9/1689* (2013.01); *G05B 2219/40195* (2013.01); *G05B 2219/40399* (2013.01); *Y10S 901/06* (2013.01); *Y10S 901/30* (2013.01)

(58) Field of Classification Search
CPC . B25J 9/16; B25J 9/1689; B25J 9/1671; B25J 19/023; B25J 3/00;
(Continued)

(56) References Cited

U.S. PATENT DOCUMENTS 5,266,875 A * 11/1993 Slotine ............... B25J 9/1689
318/568.1
5,341,459 A * 8/1994 Backes ............... B25J 9/1689
700/260
(Continued)

FOREIGN PATENT DOCUMENTS

FR 2957000 B1 * 3/2012 ............ B25J 9/1671

OTHER PUBLICATIONS

Anderson, "Autonomous, Teleoperated, and Shared Control of Robot Systems", IEEE, Apr. 1996.*

*Primary Examiner* — Nicholas Kiswanto
*Assistant Examiner* — Rachid Bendidi
(74) *Attorney, Agent, or Firm* — Taft Stettinius & Hollister LLP

(57) ABSTRACT

A machine remotely located from a control station has at least one actuated mechanism. A two way real-time communication link connects the machine location with the control station. A controller at the machine location has program code that includes an instruction which when executed transfers control of the machine from the controller to the control station. The program code can have a task (Continued)

frame associated with the predetermined function performed by the machine with the task frame divided into a first set controlled by the controller and a second set controlled from the control station. The system can also have two or more remotely located control stations only one of which can control the machine at a given time.

8 Claims, 4 Drawing Sheets

(58) Field of Classification Search
CPC ...... G05B 2219/40195; G05B 2219/40399; Y10S 901/06; Y10S 901/30; Y10S 901/49
See application file for complete search history.

(56) References Cited

U.S. PATENT DOCUMENTS

| | | | | |
|---|---|---|---|---|
| 6,845,297 B2* | 1/2005 | Allard | ............ | B25J 9/1689 318/628 |
| 2008/0065268 A1* | 3/2008 | Wang | ............ | B25J 9/1689 700/245 |
| 2009/0259339 A1* | 10/2009 | Wright | ............ | B25J 9/0003 700/264 |
| 2011/0218674 A1* | 9/2011 | Stuart | ............ | G06F 19/321 700/259 |
| 2011/0288682 A1* | 11/2011 | Pinter | ............ | B25J 9/1689 700/259 |
| 2013/0218336 A1* | 8/2013 | David | ............ | B25J 9/1671 700/248 |
| 2014/0094968 A1* | 4/2014 | Taylor | ............ | B25J 13/006 700/257 |

* cited by examiner

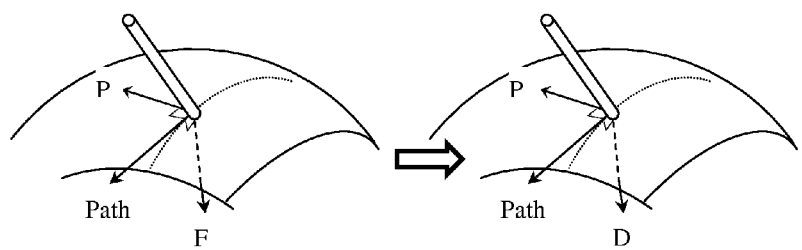
Fig. 4  Example hybrid remote control: force control is replaced with device control
P, F and D denotes Position, Force and Device control, respectively
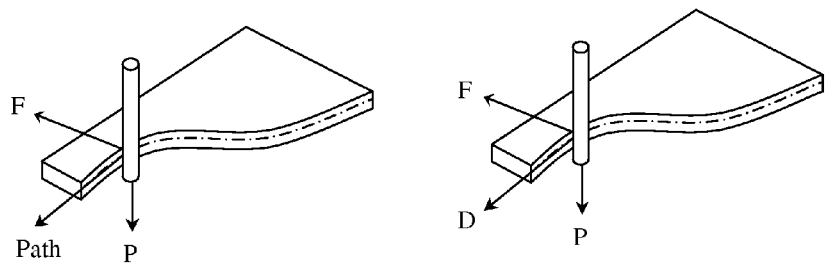
Fig. 5  Example hybrid remote control: position and force control is replaced with device control
P, F and D denotes Position, Force and Device control, respectively TELEOPERATION OF MACHINES HAVING
AT LEAST ONE ACTUATED MECHANISM
AND ONE MACHINE CONTROLLER
COMPRISING A PROGRAM CODE
INCLUDING INSTRUCTIONS FOR
TRANSFERRING CONTROL OF THE
MACHINE FROM SAID CONTROLLER TO A
REMOTE CONTROL STATION

1. FIELD OF THE INVENTION

This invention relates to the teleoperation of one or more robots or other machines with at least one actuated mechanism.

2. DESCRIPTION OF THE PRIOR ART

Teleoperation of an industrial robot occurs when the operator of the teleoperated industrial robot is located apart from the robot when the industrial robot performs work. An industrial robot is an automatically controlled, reprogrammable, multipurpose manipulator programmable in three or more axes. Examples of industrial robots are robots located at a fixed position that are mobile by themselves or mobile because the robot is mounted on a device that is itself mobile such as a motorized vehicle or mounted on a track or gantry etc.

By located apart from each other is meant that the operator and teleoperated industrial robot are either within the line of sight of each other or are separated from each other by a barrier through which the operator can see the robot that is controlled by the operator, or are at a distance from each other such that the operator cannot see the robot with his or her eyes. If there is a see through barrier, the barrier separates the operator from work performed by the robot that is hazardous to the health or safety of the operator.

The principal applications for teleoperated industrial robots are machining, handling of hazardous materials, assembling/disassembling, operation in a contaminated environment, inspection and service, or other operations in an unmanned, harsh outdoor environment such as offshore, desert, Arctic, Antarctic, subsea and space.

SUMMARY OF THE INVENTION

A system for teleoperation of a machine has at least one actuated mechanism and a predetermined number of degrees of freedom. The system comprises:

a control station remotely located from a location of the machine, the machine controlled from the control station to perform a predetermined function;

a two way real-time communication link between the machine and the remotely located control station; and a controller for the machine at the machine location, the controller having therein program code for operating the machine, the program code including an instruction which when executed transfer control of the machine from the controller to the control station.

A system for teleoperation of a machine has at least one actuated mechanism and a predetermined number of degrees of freedom. The system comprises:

two or more control stations each remotely located from a location of the machine each for controlling the machine to perform a predetermined function, the machine controllable at a given time from only one of the two or more control stations;

a two way real-time communication link between the machine and the remotely located control station; and a controller for the machine at the machine location, the controller having therein program code for operating the machine.

A system for teleoperation of a machine having at least one actuated mechanism and a predetermined number of degrees of freedom, the system comprising:

a control station remotely located from a location of the machine, the machine controlled from the control station to perform a predetermined function;

a two way real-time communication link between the machine and the remotely located control station; and a controller for the machine at the machine location, the controller having therein program code for operating the machine, the program code having therein a task frame associated with the predetermined function performed by the machine, the task frame divided into a first set controlled by the controlled and a second set controlled from the control station using the two way real-time communication link.

DESCRIPTION OF THE DRAWING

FIGS. 4 and 5 depict examples of hybrid combination of different robot controllers.

DETAILED DESCRIPTION

Figure 1:
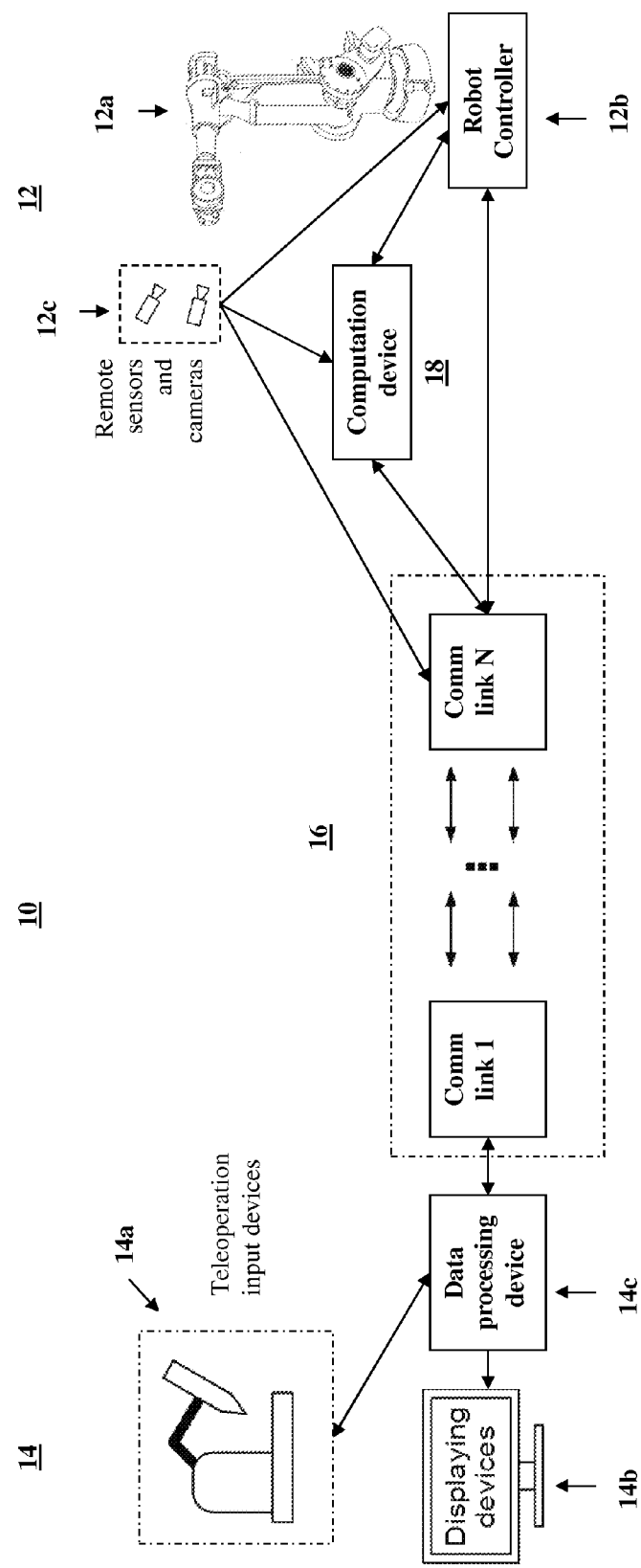
FIG. 1 shows an embodiment for a system for a teleoperated industrial robot.

Referring now to FIG. 1, there is shown a system 10 that has at least one remote robot station 12, at least one operator station 14 and at least one communication link 16 between the robot station 12 and the operator station 14. The physical distance between the remote robot station 12 and the operator station 14 can vary from "next door" to each other to "another continent".

The robot station 12 includes at least one robot 12a. Robot 12a is for example a six degree of freedom industrial robot available from ABB.

Robot station 12 also includes a robot controller 12b that includes a data interface which accepts motion commands and provides actual motion data, and optionally one or more remote sensor devices 12c that observe the robot station 12 and attached processes, such as cameras, microphones, position sensors, proximity sensors and force sensors. The sensor devices 12c may either be smart sensors, that is the sensor device 12c includes data processing capability, or not smart sensors, that is, the sensor device 12c does not include data processing capability.

If the sensor devices 12c are smart sensors then the output of the sensor devices is connected directly to robot controller 12b. If the sensor devices 12c are not smart sensors, then their output can be connected either to a computation device 18 to process the sensor device output or to the communication link 16 described in more detail below so that the sensor device output is processed in data processing device 14c.

The robot station 12 can also include as an option one or more actuators and other devices (not shown in FIG. 1 but well known to those of ordinary skill in this art), that are mounted to the robot or next to the robot, such as grippers, fixtures, welding guns, spraying guns, spotlights and conveyors.

The controller 12b has the program which when executed controls the motion of the robot 12a to perform work. As is well known, the robot may hold a tool, not shown, which is used to perform work on a stationary or moving workpiece, not shown, or may hold the workpiece which has work performed on it by an appropriate tool. The remote sensor devices 12c provide input signals to the controller 12b that the controller uses to control the robot 12a in performance of the work.

The operator station 14 has at least one teleoperation input device 14a such as joysticks or stylus-type devices which the operator uses to create continuous motion signals (position or speed signals). When force feedback is added to these devices they become haptic devices. This feedback causes a vibration in the joystick and the operator feels the force feedback in the stylus-type devices.

The signals from these input devices 14a are used by the controller 12b to operate the robot 12a. The device side also has at least one display device 14b and a data processing device 14c which is connected to both the input devices 14a and the display devices 14b.

The monitoring (display) device 14b shows actual data about the robot motion and attached processes, for example, camera images, acoustic feedback and sensor values. The data processing device 14c processes data in both directions. Device 14c may for example be an industrial PC or a PLC.

The operator station 14 may also include a safety enable device (not shown in FIG. 1) that is separate and distinct from input devices 14a and may for example be a three position switch. The safety enabling device enables and disables power to the robot 12a and attached processes.

The communication link 16 connects the robot controller 12b and the data processing device 14c to each other. The communication link 16 comprises one or more communication links 16-1 to 16-N.

The communication link 16 between the operator station 14 and the robot station 12 may be realized with various technologies (e.g. fiber-optic/radio/cable on different types and layers of data protocols). A major portion or the entire infrastructure of the communication link may already exist and be used for other purposes than teleoperating robots. Typical examples are existing Ethernet installations with LAN and WLAN, Bluetooth, ZigBee and other wireless industrial links, point-to-point radio systems or laser-optical systems, and satellite communication links.

System 10 is operated to maintain a reliable "real-time" communication link 16 between device side 14 and the remotely located robot side 12. The system 10 changes parameters of the communication link 16 and the robot motion, depending on the current available data rate and/or transmission time of the communication link 16.

In system 10, the operator has direct remote control of the motion of robot 12a and attached processes. Thus the term "real-time" as used herein is in the context of teleoperation of the motion of a robot 12a or a machine. The teleoperation is considered to be real-time if:

a maximum delay between operator commands, robot motion, and feedback about robot motion and attached processes at the operator station is not exceeded, and the maximum delay is dependent on the speed of machine motion, i.e. with slow machine motion a slightly longer delay is acceptable, and the maximum delay is deterministic, i.e. the delay time does not significantly vary over time.

Exceeding the maximum delay may result in damage to the workpiece or to the robot or other equipment on the robot side. For example, if the teleoperated robotic is used in a grinding application and the communication delay exceeds the maximum delay, this causes the operator to remove more material from the workpiece than desired. This excess removal of material can result in damage to the workpiece. Also for example, if the teleoperated robot is used in a material handling application, the communication delay exceeding the maximum delay will cause the collision between the robot 12a and other equipment on robot side.

This understanding of "real-time" is similar to real-time computation, where not only wrong results of logic and arithmetic operations can occur but also not timely results will cause errors.

Figure 2:
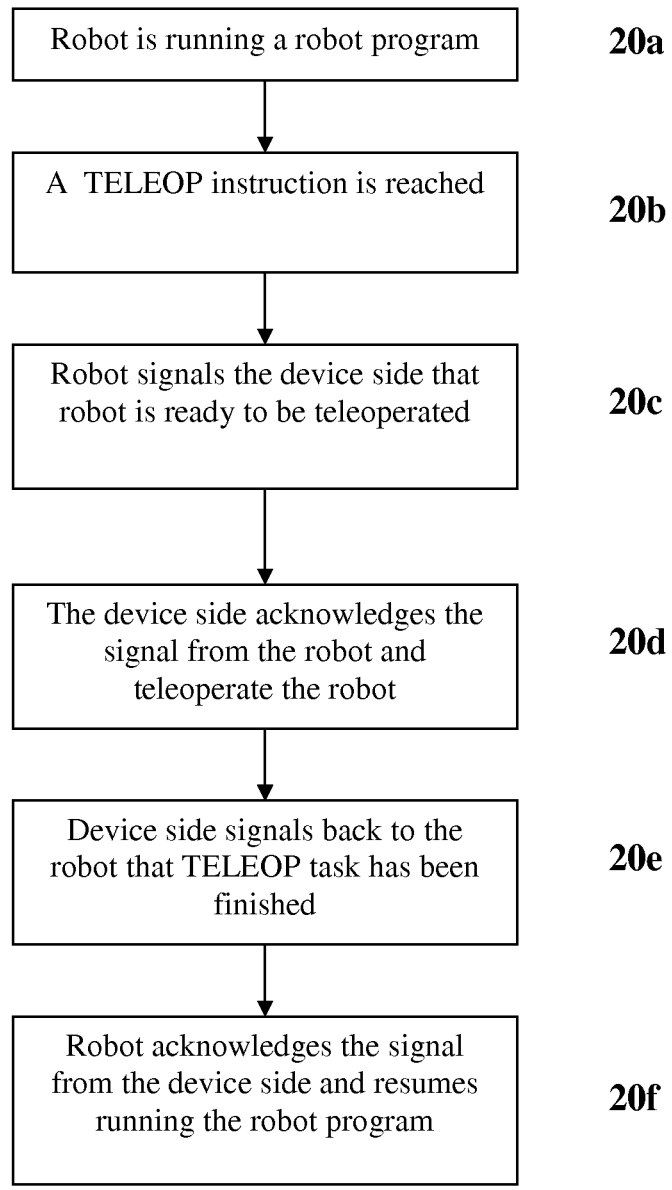
FIG. 2 shows a flowchart for the main steps for transferring control during teleoperation of the robot shown in FIG. 1 from the robot side to the device side.

Referring now to FIG. 2, there is a flowchart 20 for the main steps for transferring control during teleoperation of robot 12a from the robot side 12 to the device side 14. This transfer of control occurs when a teleoperation (TELEOP) instruction is reached in the program controlling the robot 12a. Control is transferred back to the robot side 12 when the TELEOP instruction has been fully executed. The TELEOP instruction is an instruction which when executed gives control of robot 12a to the operator on the device side 14.

The flow starts at block 20a with the robot running the robot program. At block 20b, a TELEOP instruction is reached in the robot program. Based on that instruction, the robot side 12 at block 20c signals the device side 14 that the robot 12a is ready to receive guidance such as for example a teleoperation of the robot 12a by the operator at the device side 14.

At block 20d, the device side 14 acknowledges the signal received from the robot 12a and the device side 14 guides the robot 12a. After the device side has finished providing guidance to robot 12a, the device side 14 at block 20e signals to robot 12a that the TELEOP task is completed. In response, the robot at block 20f acknowledges the signal from the device side 14 and the robot 12a resumes running the robot program.

Examples of how the robot program uses TELEOP instructions/routines to give control to device side 14 and wait for the control from the device side are:

A) 2 instructions where START and WAIT are explicit

Between the START and WAIT the robot can execute non-motion instructions. In case the robot decides to abort the TELEOP task another robot instruction is available TELEOP ABORT.
MOVEL p1
. . .
MOVEL pn
TELEOP START
TELEOP WAIT FINISH
MOVE pn+1
. . .

B) 1 instruction where the robot waits until the TELEOP task is completed (by receiving a COMPLETION
signal from the device side)
MOVEL p1
. . .
MOVEL pn
TELEOP
MOVE pn+1
. . .

C) Instructions where multiple device sides 14 are used in the TELEOP task. Since there are multiple devices 14a there can be multiple users. Each user uses one teleoperation device 14a or there can be one user, who changes the teleoperation device 14a depending on the task to be performed by the robot 12a. For example, the operator can use the joystick type of the input device 14a to operate the robot 12a in a large space and then change to a pen type of input device with haptic feedback to operate the robot for fine movement in a small space. The process to determine which user is the master of teleoperation system is described below with respect to the flowchart 30 in FIG. 3.

MOVEL p1
...
MOVEL pn
TELEOP deviceSite1
MOVE pn+1
...
MOVEL pm
TELEOP deviceSitep
MOVE pm+1

To protect the robot from unauthorized access to the TELEOP functionality and preserve the safety of the robot operation, each user that accesses the robot during a TELEOP has to login with specific TELEOP credentials before initiating a TELEOP session.

Figure 3:
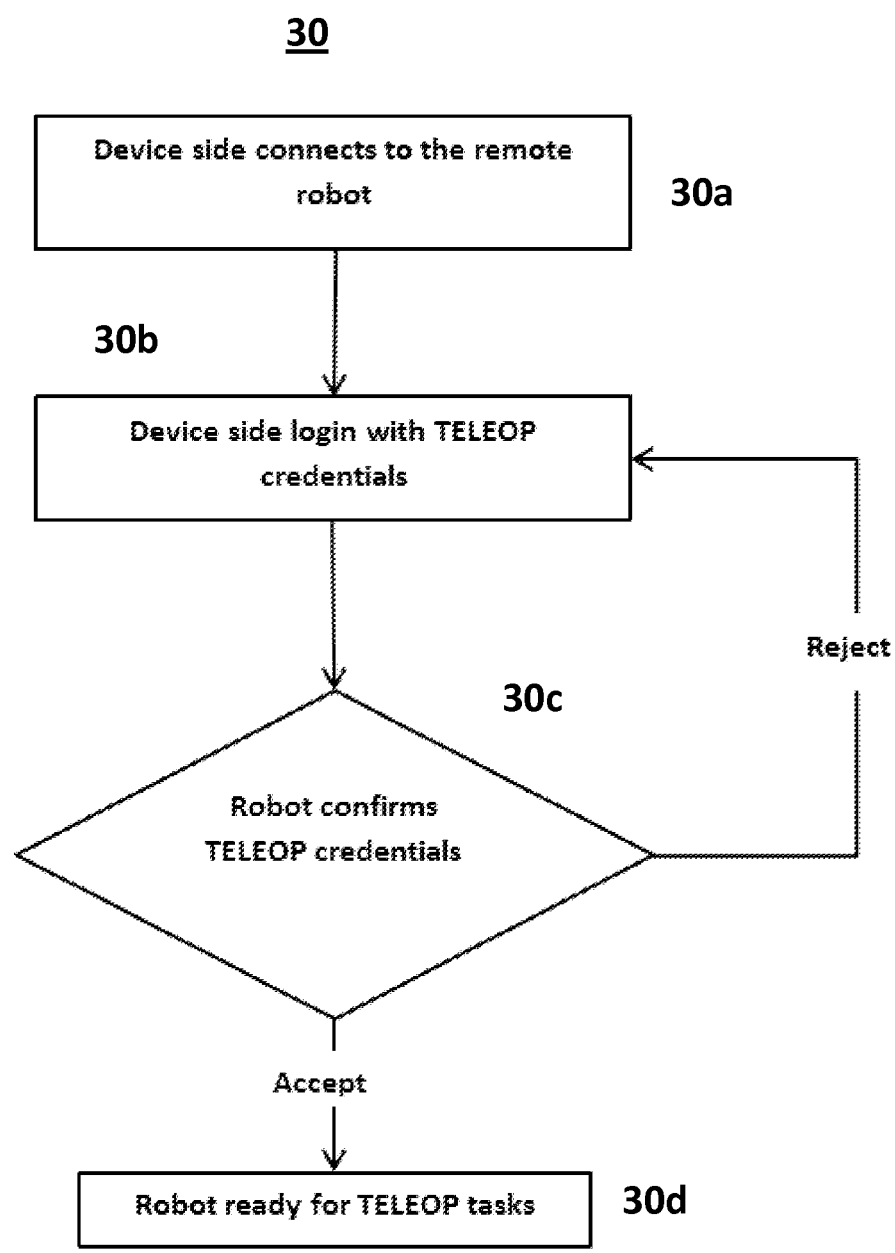
FIG. 3 shows a flowchart for determining when there are multiple teleoperation input devices are in use which user is the master of the teleoperation system.

An example of TELEOP authentication is shown in the flowchart 30 of FIG. 3. At block 30a, the device side 14 connects to the remote robot 16. At block 30b, the device side 14 logs in with the TELEOP credentials. At decision 30c, the robot 12a confirms the TELEOP credentials. If the credentials are not confirmed, the login is rejected and the flow returns to block 30b to await another login whose credentials will be confirmed. If the credentials are confirmed, then at block 30d the robot 12a is ready to perform the TELEOP tasks.

There is now described in connection with reference to FIGS. 4 and 5 a hybrid control architecture for use with teleoperated robots.

Local force control has been used with teleoperated robots but the objective of that local force control is to coexist with the remote device control in all directions of the task frame. That is, the position and velocity reference command generated by the remote device control is modified by the force control in all 6 DOFs of the task frame. As a result, the robot stiffness is weak in all the directions. This strategy is inefficient and cannot be used where high stiffness is required in a few selected directions such as polishing and grinding. Hybrid position and force control is often used if the robot is completely controlled locally.

The traditional hybrid control architecture (such as hybrid position and force control) is extended by the technique described below from local to teleoperation of robot 12a. The 6 DOFs of the task frame are partitioned into two sets. One set is controlled by the remote device 14a, and the other set is controlled either by the slave robot side force control or the position control with the user predefined motion or path. The task frame can be one of the predefined frames in the robot program such as the tool frame, the work object frame, the path frame, robot base frame, world frame etc. or offset from one of the predefined frames.

Hybrid remote control architecture is very useful for tele-machining tasks. For example, in deburring, grinding or polishing processes, it is desirable that the tool orientation keeps fixed, the feed direction is controlled by the remote input device to follow the workpiece contour, and constant force is maintained in the contact normal direction between the tool and the workpiece.

FIGS. 4 and 5 depict examples of hybrid combination of different controllers.

The left side of FIG. 4 shows the hybrid position control for a completely locally controlled robot in an exemplar polishing application. The path of the robot motion is preprogrammed. During the execution, the robot is force controlled denoted by F only in the tool axis direction, while all the other directions are position controlled. Comparing the left and right sides of FIG. 4 shows that the force control F in the left side of that figure is replaced in the right side of that figure by device control denoted by D where P denotes Position control.

Comparing the left and right sides of FIG. 5 shows that position control P and force control F in the left side of that figure is replaced in the right side of that figure by device control D.

In deciding which control mode is preferred and in which direction, various criteria must be considered such as:
  processing tool geometry and characteristics;
  part geometry and degree of irregularity/uncertainty;
  tool-to-part contact configuration;
  predicted amount of reaction force;
  performance and characteristics of the input device;
  operator's teleoperating skill levels.

For example, if the robot 12a is to be teleoperated in an application, for example, deburring of an cast engine block, then the system designer will consider the criteria listed above and decide which control mode will be used.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for teleoperation of a machine having at least one actuated mechanism and a predetermined number of degrees of freedom, said system comprising:
  a control station remotely located from a location of said machine, said machine controlled from said control station to perform a predetermined function;
  a two way real-time communication link between said machine and said remotely located control station; and
  a controller at said machine location, said controller having therein a program code configured to operate said machine, said program code includes a teleoperation instruction which when executed, transfers control of said machine from said controller to said control station, wherein during operation of said machine by execution of said program code, the transfer of control of said machine from said controller to said control station occurs when the executed program code reaches said teleoperation instruction, the control being transferred back to said controller when said teleoperation instruction has been fully executed,
  wherein said program code in said controller is configured to use said two way real-time communication link to signal said control station, when said teleoperation instruction which transfers control of said machine from said controller to said control station is executed, that said machine is ready to be operated by said control station,
  wherein said control station uses said two way real-time communication link to acknowledge to said machine location said signal from said controller that said machine is ready to be operated by said control station and then operates said machine from said control station, wherein said control station uses said two way real-time communication link to signal said machine location when said control station has finished operation of said machine, and wherein said machine is a robot.

2. The system of claim 1 wherein said controller acknowledges receipt of said signal from said control station that said control station has finished operation of said machine and said controller is configured to resume use of said program code of said controller to operate said machine.

3. The system of claim 1 wherein said control station has two or more devices, only one of the two or more devices being used at a time for controlling said machine from said control station.

4. A system for teleoperation of a machine having at least one actuated mechanism and a predetermined number of degrees of freedom, said system comprising:

two or more control stations each remotely located from a location of said machine, each of said two or more control stations configured to control said machine to perform a predetermined function, said machine controllable at a given time from only one of said two or more control stations;

a two way real-time communication link between said machine and said remotely located control station; and a controller at said machine location, said controller having therein program code configured to operate said machine, said program code includes a teleoperation instruction which when executed, transfers control of said machine from said controller to one of said two control stations, wherein during operation of said machine by execution of said program code, the transfer of control of said machine from said controller to one of said control stations occurs when the executed program code reaches said teleoperation instruction, the control being transferred back to said controller when said teleoperation instruction has been fully executed, wherein each of said two or more control stations has a unique identifier that is known to said controller and that one of said two or more control stations whose unique identifier is acknowledged by said controller becomes that one of said two or more control stations that can control said machine, and wherein said machine is a robot.

5. The system of claim 4 wherein each of said two or more control stations has a unique identifier that is known to said controller and that one of said two or more control stations whose unique identifier is acknowledged by said controller becomes that one of said two or more control stations that can control said machine.

6. A system for teleoperation of a machine having at least one actuated mechanism and a predetermined number of degrees of freedom, said system comprising:

a control station remotely located from a location of said machine, said machine controlled from said control station to perform a predetermined function;

a two way real-time communication link between said machine and said remotely located control station; and a controller at said machine location, said controller having therein program code configured to operate said machine, said program code having therein a task frame associated with said predetermined function performed by said machine, said task frame divided into a first set controlled by said controller and a second set controlled from said control station using said two way real-time communication link, said program code includes a teleoperation instruction which when executed, transfers control of said machine from said controller to said control station, wherein the transfer of control of said machine from said controller to said control station occurs when said teleoperation instruction is reached in the program controlling said machine, the control being transferred back to said controller when said teleoperation instruction has been fully executed, wherein control of said machine to perform said predetermined function on said workpiece is switched between said controller and said control station based on predetermined criteria, and wherein said machine is a robot.

7. The system of claim 6 wherein said program code has a predefined number of task frames, said predefined number of task frames including said task frame associated with said predetermined function performed by said machine.

8. The system of claim 7 wherein said predefined number of task frames comprise one or more of a tool frame, a work object frame, a path frame, a machine base frame or a world or an offset from one of said foregoing predefined number of task frames.

* * * * *